United States Patent
Zhang (10) Patent No.: US 10,211,656 B2
(45) Date of Patent: Feb. 19, 2019

(54) POWER ADAPTER, TERMINAL, AND METHOD FOR PROCESSING EXCEPTION OF CHARGING LOOP

(71) Applicant: GUANGDONG OPPO MOBILE TELECOMMUNICATIONS CORP., LTD., Dongguan (CN)

(72) Inventor: Jialiang Zhang, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 13 days.

(21) Appl. No.: 15/115,224

(22) PCT Filed: Jan. 9, 2015

(86) PCT No.: PCT/CN2015/070469
§ 371 (c)(1),
(2) Date: Jul. 28, 2016

(87) PCT Pub. No.: WO2015/113466
PCT Pub. Date: Aug. 6, 2015

(65) Prior Publication Data
US 2016/0344228 A1     Nov. 24, 2016

(30) Foreign Application Priority Data

Jan. 28, 2014   (CN) .................... 2014 1 0042541
Jan. 28, 2014   (CN) .................... 2014 1 0043139
Jan. 28, 2014   (CN) .................... 2014 1 0043218

(51) Int. Cl.
*H02J 7/00*     (2006.01)
*H02J 7/02*     (2016.01)
*H02J 7/04*     (2006.01)

(52) U.S. Cl.
CPC ............ *H02J 7/0031* (2013.01); *H02J 7/00* (2013.01); *H02J 7/0029* (2013.01);
(Continued)

(58) Field of Classification Search
CPC ...... H02J 7/0031; H02J 7/0029; H02J 7/0057; H02J 7/042; H02J 7/027; H02J 7/00;
(Continued)

(56) References Cited

U.S. PATENT DOCUMENTS 5,541,489 A    7/1996   Dunstan
5,557,738 A *  9/1996   Townsley .............. G06F 1/30
                                                    307/66

(Continued)

FOREIGN PATENT DOCUMENTS

CN    1499689 A    5/2004
CN    1950998 A    4/2007
(Continued)

OTHER PUBLICATIONS

Chinese Patent Application No. 201410042541.0 First Office Action dated Jul. 17, 2015, with English translation, 10 pages.
(Continued)

*Primary Examiner* — M'Baye Diao
(74) *Attorney, Agent, or Firm* — Lathrop Gage LLP (57) ABSTRACT

A power adapter comprises a power conversion unit, a charging interface, an anomaly detection unit, and an anomaly handing unit. The power conversion unit forms a charging loop with a terminal via the charging interface, so as to charge a battery of the terminal. The anomaly detection unit detects whether an anomaly occurs on the charging loop. When the anomaly occurs on the charging loop, the anomaly handing unit controls the charging loop to enter into a protection state. The power adapter can improve the
(Continued)

US 10,211,656 B2

Page 2 security of a charging process. Also provided are a terminal, and a method for handing an anomaly in a charging loop.

17 Claims, 3 Drawing Sheets

(52) U.S. Cl.
CPC ............ *H02J 7/0057* (2013.01); *H02J 7/027* (2013.01); *H02J 7/042* (2013.01); *H02J 2007/0037* (2013.01); *H02J 2007/0039* (2013.01); *H02J 2007/0096* (2013.01)

(58) Field of Classification Search
CPC ....... H02J 2007/0039; H02J 2007/0037; H02J 2007/0096
USPC .................................................. 320/107, 137
See application file for complete search history.

(56) References Cited

U.S. PATENT DOCUMENTS

| | | | |
|---|---|---|---|
| 5,905,362 A | 5/1999 | Nagano et al. | |
| 6,018,703 A * | 1/2000 | Dodd .................... | G05B 13/024 330/278 |
| 6,501,249 B1 | 12/2002 | Drori | |
| 7,065,662 B2 * | 6/2006 | Chen ........................ | G05F 1/56 307/100 |
| 7,363,518 B2 * | 4/2008 | Critz ....................... | G06F 11/00 314/115 |
| 7,378,755 B2 | 5/2008 | Kingsmore, Jr. et al. | |
| 7,649,550 B2 * | 1/2010 | Ishiyama ........... | H04N 5/23203 348/211.14 |
| 7,737,590 B2 * | 6/2010 | Oyama ............... | F16C 32/0444 310/68 B |
| 8,064,513 B2 * | 11/2011 | Yamazaki ................ | H03K 3/64 370/311 |
| 8,098,053 B2 | 1/2012 | Sato | |
| 8,261,100 B2 * | 9/2012 | Paniagua, Jr. ............. | G06F 1/26 320/114 |
| 8,513,923 B2 | 8/2013 | Wang et al. | |
| 9,020,771 B1 * | 4/2015 | Hardy ..................... | G06Q 50/06 702/61 |
| 9,099,864 B2 * | 8/2015 | Shoykhet ................ | G06F 13/38 |
| 9,337,919 B2 * | 5/2016 | Kikuchi ................... | H04B 7/24 |
| 9,825,348 B2 * | 11/2017 | Kikuchi ................... | H01P 5/02 |
| 9,859,742 B2 * | 1/2018 | Zhang .................. | H02J 7/0021 |
| 10,008,868 B2 * | 6/2018 | Zhang .................. | H02J 7/0029 |
| 2001/0021092 A1 | 9/2001 | Astala | |
| 2002/0098859 A1 | 7/2002 | Murata | |
| 2004/0090209 A1 * | 5/2004 | Nishida ................ | H02J 7/0073 320/149 |
| 2004/0108843 A1 * | 6/2004 | Lanni ........................ | G05F 1/56 323/271 |
| 2005/0174094 A1 | 8/2005 | Purdy et al. | |
| 2006/0093916 A1 | 5/2006 | Howard et al. | |
| 2006/0152196 A1 | 7/2006 | Matsumoto et al. | |
| 2006/0170398 A1 | 8/2006 | Gangsto et al. | |
| 2006/0234125 A1 | 10/2006 | Valle | |
| 2006/0284595 A1 * | 12/2006 | Hsieh .................... | H02J 7/0077 320/115 |
| 2008/0111520 A1 | 5/2008 | Sasaki | |
| 2008/0224662 A1 | 9/2008 | Hayakawa | |
| 2008/0231236 A1 | 9/2008 | Watanabe et al. | |
| 2008/0287080 A1 | 11/2008 | Camp, Jr. et al. | |
| 2009/0153100 A1 | 6/2009 | Okumura et al. | |
| 2009/0177906 A1 * | 7/2009 | Paniagua, Jr. ............. | G06F 1/26 713/340 |
| 2009/0243552 A1 | 10/2009 | Jakes et al. | |
| 2010/0066311 A1 | 3/2010 | Bao et al. | |
| 2010/0077237 A1 * | 3/2010 | Sawyers .................. | G06F 1/26 713/300 |
| 2010/0085020 A1 | 4/2010 | Suzuki et al. | |
| 2010/0308775 A1 | 12/2010 | Mizutani et al. | |
| 2011/0248670 A1 | 10/2011 | Yamazaki et al. | |
| 2012/0098495 A1 | 4/2012 | Yang et al. | |
| 2012/0133336 A1 | 5/2012 | Han et al. | |
| 2012/0268074 A1 * | 10/2012 | Cooley .................. | H01G 11/58 320/130 |
| 2012/0293009 A1 | 11/2012 | Kim et al. | |
| 2013/0082662 A1 | 4/2013 | Carré et al. | |
| 2013/0175978 A1 * | 7/2013 | Hsiao ........................ | H02J 7/02 320/107 |
| 2013/0214611 A1 | 8/2013 | Bae | |
| 2013/0254560 A1 | 9/2013 | Leung | |
| 2016/0336767 A1 * | 11/2016 | Zane ...................... | H02J 7/0021 |
| 2016/0344227 A1 | 11/2016 | Zhang et al. | |

FOREIGN PATENT DOCUMENTS

| | | |
|---|---|---|
| CN | 1989675 A | 6/2007 |
| CN | 101013764 A | 8/2007 |
| CN | 101026309 A | 8/2007 |
| CN | 201207574 Y | 3/2009 |
| CN | 201278420 Y | 7/2009 |
| CN | 101651356 A | 2/2010 |
| CN | 101714772 Y | 5/2010 |
| CN | 101719685 A | 6/2010 |
| CN | 101783427 A | 7/2010 |
| CN | 101888098 A | 11/2010 |
| CN | 101651356 A | 12/2010 |
| CN | 101908771 A | 12/2010 |
| CN | 102013705 A | 4/2011 |
| CN | 102214941 A | 10/2011 |
| CN | 202218051 U | 5/2012 |
| CN | 102931693 A | 2/2013 |
| CN | 103178595 A | 6/2013 |
| CN | 203135543 U | 8/2013 |
| CN | 103326407 A | 9/2013 |
| CN | 103370863 A | 10/2013 |
| CN | 103762691 A | 4/2014 |
| CN | 103779907 A | 5/2014 |
| CN | 103795040 A | 5/2014 |
| CN | 203747392 U | 7/2014 |
| CN | 203747451 U | 7/2014 |
| CN | 203747452 U | 7/2014 |
| CN | 203747453 U | 7/2014 |
| EP | 1455431 A | 9/2004 |
| EP | 1796243 A2 | 6/2007 |
| EP | 1821384 A2 | 8/2007 |
| EP | 2071696 A | 6/2009 |
| EP | 2175542 A2 | 4/2010 |
| EP | 2239810 A1 | 10/2010 |
| EP | 3101755 A1 | 12/2016 |
| JP | H09168241 A | 6/1997 |
| JP | H1027630 A | 1/1998 |
| JP | H11143591 A | 5/1999 |
| JP | H11215727 A | 8/1999 |
| JP | 2004274875 A | 9/2004 |
| JP | 2007020203 A | 1/2007 |
| JP | 2007110853 A | 4/2007 |
| JP | 2007327772 A | 12/2007 |
| JP | 2008009898 A | 1/2008 |
| JP | 2008035674 A | 2/2008 |
| JP | 2008061343 A | 3/2008 |
| JP | 2008061381 A | 3/2008 |
| JP | 2010058244 A | 3/2010 |
| JP | 2010165347 A | 7/2010 |
| JP | 2012079547 A | 4/2012 |
| JP | 2013108793 A | 6/2013 |
| JP | 2013132183 A | 7/2013 |
| JP | 2013134683 A | 7/2013 |
| KR | 20040024552 A | 3/2004 |
| KR | 20080034141 A | 4/2008 |
| KR | 20130002970 A | 1/2013 |
| WO | WO 2010117498 A2 | 10/2010 |
| WO | WO 2012021128 A1 | 2/2012 |

(56) References Cited

FOREIGN PATENT DOCUMENTS

| WO | WO 2012165071 A1 | 12/2012 |
|---|---|---|
| WO | WO 2013001909 A1 | 1/2013 |

OTHER PUBLICATIONS

Chinese Patent Application No. CN201410043139.4 First Office Action dated Dec. 23, 2015, with English translation, 8 pages.
Japanese Patent Application No. 2016-549039, Office Action dated Jun. 27, 2017, with English translation, 7 pages.
Chinese Patent Application No. 201410043218.5 First Office Action dated May 25, 2015, with English translation, 10 pages.
Translation of the International Search Report and Written Opinion corresponding to International Patent Application PCT/CN2015/070469, dated Apr. 20, 2015, 10 pages.
European Patent Application No. 15743390.5 extended search and opinion dated Sep. 22, 2017, 8 pages.
Japanese Patent Application No. 2016-549039 English translation of Notification of Reasons for Refusal dated Sep. 12, 2017, 3 pages.
Japanese Patent Application No. 2016-549039 Notification of Reasons for Refusal dated Sep. 12, 2017, 4 pages.
Japanese Patent Application No. 2016549039, English translation of Office Action dated Nov. 28, 2017, 3 pages.
Japanese Patent Application No. 2016549039, Office Action dated Nov. 28, 2017, 4 pages.
Chilean Patent Application No. 201601915 Office Action dated Oct. 19, 2017, 7 pages.
Chilean Patent Application No. 201700970 Office Action dated Apr. 19, 2018, 9 pages.
Chinese Patent Application No. 201410042541.0 Office Action dated Jul. 17, 2015, 5 pages.
Chinese Patent Application No. 201410042541.0 English translation of Office Action dated Jul. 17, 2015, 5 pages.
Chinese Patent Application No. 201410042541.0 Office Action dated Mar. 16, 2016, 3 pages.
Chinese Patent Application No. 201410042541.0 English translation of Office Action dated Mar. 16, 2016, 4 pages.
Chinese Patent Application No. 201410043139.4 Office Action dated Dec. 23, 2015, 3 pages.
Chinese Patent Application No. 201410043139.4 English translation of Office Action dated Dec. 23, 2015, 5 pages.
Chinese Patent Application No. 201410043218.5 Office Action dated May 25, 2015, 5 pages.
Chinese Patent Application No. 201410043218.5 English translation of Office Action dated May 25, 2015, 5 pages.
Chinese Patent Application No. 201610763798.4 Office Action dated Jun. 15, 2017, 5 pages.
Chinese Patent Application No. 201610763798.4 English translation of Office Action dated Jun. 15, 2017, 8 pages.
Chinese Patent Application No. 201610763798.4 Office Action dated Sep. 19, 2017, 6 pages.
Chinese Patent Application No. 201610763798.4 English translation of Office Action dated Sep. 19, 2017, 9 pages.
Chinese Patent Application No. 201610763798.4 Office Action dated Jan. 11, 2018, 5 pages.
Chinese Patent Application No. 201610763798.4 English translation of Office Action dated Jan. 11, 2018, 5 pages.
Chinese Patent Application No. 201610973222.0 Office Action dated Jun. 1, 2017, 4 pages.
Chinese Patent Application No. 201610973222.0 English translation of Office Action dated Jun. 1, 2017, 6 pages.
Chinese Patent Application No. 201610973222.0 Office Action dated Jul. 13, 2017, 4 pages.
Chinese Patent Application No. 201610973222.0 English translation of Office Action dated Jul. 13, 2017, 6 pages.
Chinese Patent Application No. 201610973222.0 Office Action dated Sep. 25, 2017, 6 pages.
Chinese Patent Application No. 201610973222.0 English translation of Office Action dated Sep. 25, 2017, 9 pages.
European Patent Application No. 14881017.9 extended Search and Opinion dated Nov. 23, 2017, 7 pages.
European Patent Application No. 14881229.0 extended Search and Opinion dated Sep. 6, 2017, 8 pages.
European Patent Application No. 14880730.8 extended Search and Opinion dated Oct. 24, 2017, 7 pages.
European Patent Application No. 18174633.0 extended Search and Opinion dated Aug. 9, 2018, 7 pages.
Japanese Patent Application No. 2016549501 Office Action dated Nov. 14, 2017, 2 pages.
Japanese Patent Application No. 2016549501 English translation of Office Action dated Nov. 14, 2017, 2 pages.
Japanese Patent Application No. 2016549390 Office Action dated Aug. 8, 2017, 3 pages.
Japanese Patent Application No. 2016549390 English translation of Office Action dated Aug. 8, 2017, 3 pages.
Japanese Patent Application No. 2017215256 Office Action dated Dec. 5, 2017, 3 pages.
Japanese Patent Application No. 2017215256 English translation of Office Action dated Dec. 5, 2017, 3 pages.
Korean Patent Application No. 20167023621 Office Action dated Aug. 9, 2017, 3 pages.
Korean Patent Application No. 20167023621 English translation of Office Action dated Aug. 9, 2017, 2 pages.
Korean Patent Application No. 20167023621 Office Action dated Feb. 27, 2018, 2 pages.
Korean Patent Application No. 20167023621 English translation of Office Action dated Feb. 27, 2018, 2 pages.
Korean Patent Application No. 20167023636 Office Action dated Jul. 24, 2018, 2 pages.
Korean Patent Application No. 20167023636 English translation of Office Action dated Jul. 24, 2018, 1 page.
Singapore Patent Application No. 11201606223P Office Action dated May 19, 2017, 8 pages.
Singapore Patent Application No. 11201606223P Office Action dated Jan. 9, 2018, 6 pages.
U.S. Appl. No. 15/115,045 Office Action dated Nov. 22, 2017, 15 pages.
U.S. Appl. No. 15/114,929 Office Action dated Jun. 22, 2018, 27 pages.
U.S. Appl. No. 15/115,251 Office Action dated Oct. 13, 2017, 42 pages.
U.S. Appl. No. 15/115,251 Office Action dated Feb. 20, 2018, 45 pages.
U.S. Appl. No. 15/115,251 Office Action dated Jun. 5, 2018, 47 pages.
U.S. Appl. No. 15/666,881 Office Action dated Jan. 22, 2018, 22 pages.
PCT/CN2014/076974 International Search Report dated Oct. 29, 2014, 4 pages.
PCT/CN2014/076974 English translation of International Search Report dated Oct. 29, 2014, 2 pages.
PCT/CN2014/077287 International Search Report dated Oct. 29, 2014, 4 pages.
PCT/CN2014/077287 English translation of International Search Report dated Sep. 29, 2014, 2 pages.
PCT/CN201/4077474 International Search Report dated Nov. 14, 2014, 5 pages.
PCT/CN201/4077474 English translation of International Search Report dated Nov. 14, 2014, 3 pages.
Texas Instruments: "USB Dedicated Charging Port Controller and Current Limiting Power Switch Check for Samples: TPS2511-Q1", Jun. 30, 2013 (Jun. 30, 2013), XP055420944, Retrieved from the Internet: URL:http://www.ti.com/lit/ds/symlink/tps25II-q1.pdf, cited in European Patent Application; 18174633; 28 pages.
Chinese Patent Application No. 201580005233.3, Office Action dated Aug. 30, 2018, 7 pages.
Chinese Patent Application No. 201580005233.3, English translation of Office Action dated Aug. 30, 2018, 8 pages.
Korean Patent Application No. 10-2016-7023514, English translation of Office Action dated Dec. 14, 2018, 6 pages.

(56) References Cited

OTHER PUBLICATIONS

Korean Patent Application No. 10-2016-7023514, Office Action dated Dec. 14, 2018, 7 pages.

* cited by examiner

POWER ADAPTER, TERMINAL, AND METHOD FOR PROCESSING EXCEPTION OF CHARGING LOOP

CROSS-REFERENCE TO RELATED APPLICATIONS

This application is a U.S. national phase application based on International Application No. PCT/CN2015/070469, filed on Jan. 9, 2015, which is based on and claims priority to Chinese Patent Application Nos. 201410042541.0, 201410043139.4, 201410043218.5, all filed on Jan. 28, 2014, the entire contents of which are incorporated herein by reference.

TECHNICAL FIELD

Embodiments of the present disclosure relate to the charging technical field, and more particularly, to a power adapter, a terminal and a method for handling an anomaly in a charging loop.

BACKGROUND

Currently, batteries in most of electronic devices are connected with external power adapters via charging interfaces of the electronic devices to realize charging. In order to reduce charging time during charging the battery, the charging current can be enhanced for realizing a quick charging on the battery in the related art. However, if an anomaly occurs in a charging loop, for example, an output voltage of the power adapter is an over-voltage and/or an output current of the power adapter is an over-current, the battery will be damaged, no matter whether the battery is charged in a conventional constant voltage mode or with increased charging current. Therefore, the anomaly in the charging loop cannot be detected and handled in the related art, such that the safety during the charging is poor.

SUMMARY

Embodiments of the present disclosure provide a power adapter, a terminal and a method for handling an anomaly in a charging loop.

In at least one embodiment, a power adapter is provided, including a power conversion unit and a charging interface. The power conversion unit is configured to form a charging loop with a terminal via the charging interface so as to charge a battery of the terminal. The power adapter further includes: an anomaly detection unit and an anomaly handling unit. The anomaly detection unit is configured to detect whether an anomaly occurs in the charging loop. The anomaly handling unit is configured to control the charging loop to enter into a protection state if the anomaly occurs in the charging loop.

In at least one embodiment, a terminal is provided. The terminal includes a battery and a charging interface. The terminal is configured to form a charging loop with a power adapter via the charging interface so as to charge the battery. The terminal further includes a communication unit and an anomaly handling unit. The communication unit is configured to receive charging protection indicative information from the power adapter if an anomaly occurs in the charging loop. The anomaly handling unit is configured to control the charging loop to enter into a protection state according to an indication of the charging protection indicative information.

In at least one embodiment, a method for handling an anomaly in a charging loop is provided, including: detecting, by a power adapter, whether the anomaly occurs in the charging loop between the power adapter and a terminal; and controlling, by the power adapter, the charging loop to enter into a protection state if the anomaly occurs in the charging loop.

In at least one embodiment, a method for handling an anomaly in a charging loop is provided, including: receiving, by a terminal, charging protection indicative information from a power adapter if the anomaly occurs in the charging loop between the power adapter and the terminal; and controlling, by the terminal, the charging loop to enter into a protection state according to an indication of the charging protection indicative information.

BRIEF DESCRIPTION OF THE DRAWINGS

In order to make the technical solutions of embodiments of the present disclosure more clearly, the accompanying drawings used in the description of embodiments of the present disclosure are briefly described hereunder. Obviously, the described drawings are merely some embodiments of present disclosure. For those skilled in the art, other drawings can be obtained based on these drawings without any creative work.

DETAILED DESCRIPTION

The technical solutions in embodiments of the present disclosure are hereinafter described clearly and completely with reference to the accompanying drawings in embodiments of the present disclosure. Apparently, the described embodiments are merely a part of embodiments of the present disclosure, rather than all embodiments of the present disclosure. All other embodiments obtained by those skilled in the art based on embodiments of the present disclosure without creative efforts shall fall within the protection scope of the present disclosure.

Figure 1:
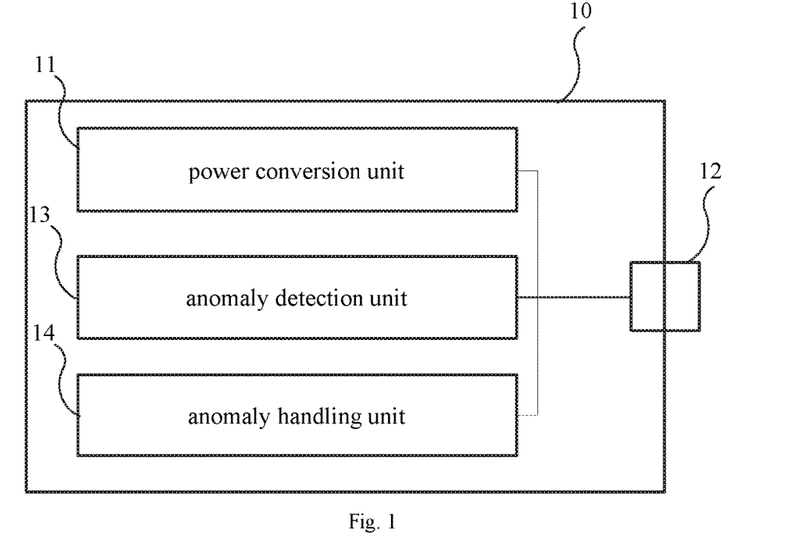
FIG. 1 is a schematic block diagram showing a power adapter according to an embodiment of the present disclosure.

FIG. 1 is a schematic block diagram showing a power adapter 10 according to an embodiment of the present disclosure. The power adapter 10 shown in FIG. 1 includes: a power conversion unit 11 and a charging interface 12. The power conversion unit 11 is configured to form a charging loop with a terminal through the charging interface 12, so as to charge a battery of the terminal. The power adapter 10 further includes an anomaly detection unit 13 and an anomaly handling unit 14.

The anomaly detection unit 13 is configured to detect whether an anomaly occurs in the charging loop. The anomaly handling unit 14 is configured to control the charging loop to enter into a protection state in event that the anomaly occurs in the charging loop.

In at least one embodiment, the above anomaly handling unit 14 is configured to control the charging loop to enter into the protection state which can be achieved by reducing an output voltage of the power adapter 10, reducing an output current of the power adapter 10, or disconnecting the charging loop.

In embodiments of the present disclosure, the power adapter 10 detects whether the anomaly occurs in the charging loop through the anomaly detection unit 13, and controls the charging loop to enter into the protection state through the anomaly handling unit 14 in event that it is detected that the anomaly occurs in the charging loop.

Figure 2:
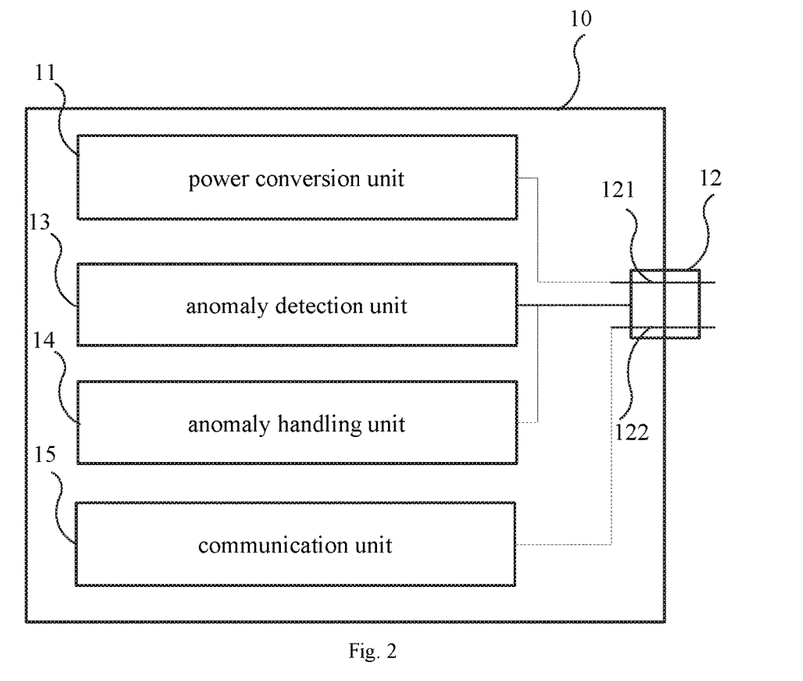
FIG. 2 is a schematic block diagram showing a power adapter according to another embodiment of the present disclosure.

In at least one embodiment, as shown in FIG. 2, the power adapter 10 can further include a communication unit 15. The communication unit 15 is configured to send charging protection indicative information to the terminal in event that the anomaly occurs in the charging loop, so as to indicate the terminal to control the charging loop to enter into the protection state.

In embodiments of the present disclosure, in event that the anomaly occurs in the charging loop, the power adapter 10 not only actively controls the charging loop to enter into the protection state, but also tells the terminal to control the charging loop to enter into the protection state. In this way, even when the anomaly handling unit 14 of the power adapter 10 loses efficacy and cannot control the charging loop to enter into the protection state, the terminal can control the charging loop to enter into the protection state.

In at least one embodiment, as shown in FIG. 2, the charging interface 12 can include a power wire 121 and a data wire 122. The power conversion unit 11 is configured to form the charging loop with the terminal through the charging interface 12 so as to charge the battery of the terminal which can be achieved by forming the charging loop with the terminal through the power wire 121 in the charging interface 12 so as to charge the battery of the terminal. The communication unit 15 is configured to send the charging protection indicative information to the terminal which can be achieved by sending the charging protection indicative information to the terminal through the data wire 122 in the charging interface 12.

In at least one embodiment, the charging interface 12 can be a USB (Universal Serial Bus) interface or a micro USB interface. The power wire in a USB interface can include a +5V power wire and a −5V power wire. The data wire in a USB interface can include a D+ wire and a D− wire.

In at least one embodiment, there can be various reasons resulting in the anomaly in the charging loop, such as an output voltage of the power adapter 10 is an over-voltage, an output current of the power adapter 10 is an over-current, a voltage at two ends of the battery is an over-voltage, a current at two ends of the battery is an over-current, or a temperature of the battery is an over-temperature. Different anomalies can be detected by different detection ways.

In at least one embodiment, the anomaly detection unit 13 is configured to detect whether the anomaly occurs in the charging loop which can be achieved by detecting a value of the output voltage of the power adapter 10, comparing the value of the output voltage of the power adapter 10 with a voltage threshold, determining that the output voltage of the power adapter 10 is the over-voltage and the anomaly occurs in the charging loop in event that the value of the output voltage is greater than the voltage threshold.

In at least one embodiment, the above voltage threshold can be set according to the specific model numbers of the power adapter 10 and the terminal or based on experiences.

Further, the power adapter 10 can further include a communication unit 15. The communication unit 15 is configured to send first indicative information to the terminal in event that the value of the output voltage of the power adapter 10 is less than the voltage threshold. The first indicative information includes the value of the output voltage of the power adapter 10 and is configured to indicate the terminal to determine whether the output voltage of the power adapter 10 is the over-voltage based on a voltage threshold set at the terminal side.

In other words, both the power adapter 10 and the terminal detect whether the output voltage of the power adapter 10 is the over-voltage. In this way, even when a detection result of the power adapter 10 is wrong (for example, the anomaly detection unit 13 of the power adapter 10 has a breakdown), the terminal can detect whether the output voltage of the power adapter 10 is the over-voltage. The terminal can control the charging loop to enter into the protection state. Alternatively, the power adapter 10 and the terminal do not form a complete set, the situation that a safe output voltage defined by the power adapter 10 exceeds an acceptable range of the terminal can occur. Further, the anomaly handling unit 14 can include a redundancy over-voltage processing unit. That is, when one over-voltage processing unit loses efficacy, the anomaly handling unit 14 can control the charging loop to enter into the protection state through other over-voltage processing unit.

In at least one embodiment, the anomaly detection unit 13 is configured to detect whether the anomaly occurs in the charging loop which can be achieved by detecting a value of the output current of the power adapter 10, comparing the value of the output current of the power adapter 10 with a current threshold, determining that the output current of the power adapter 10 is the over-current and the anomaly occurs in the charging loop in event that the output current is greater than the current threshold.

In at least one embodiment, the above current threshold can be set according to the specific model numbers of the power adapter 10 and the terminal or based on experiences.

Further, the power adapter 10 can further include a communication unit 15. The communication unit 15 is configured to send second indicative information to the terminal in event that the value of the output current of the power adapter 10 is less than the current threshold. The second indicative information includes the value of the output current of the power adapter 10 and is configured to indicate the terminal to re-determine whether the output current of the power adapter 10 is the over-current based on a current threshold set at the terminal side.

In other words, both the power adapter 10 and the terminal detect whether the output current of the power adapter 10 is the over-current. In this way, even when a detection result of the power adapter 10 is wrong (for example, a detection circuit of the power adapter 10 has a breakdown), the terminal can detect whether the output current of the power adapter 10 is the over-current, such that the terminal can control the charging loop to enter into the protection state. Alternatively, the power adapter 10 and the terminal do not form a complete set, the situation that a safe output current defined by the power adapter 10 exceeds an acceptable range of the terminal can occur.

In at least one embodiment, the power adapter 10 can further include: a communication unit 15. The communication unit 15 is configured to receive a battery parameter detected by the terminal. The battery parameter is configured to indicate the voltage at two ends of the battery, the current at two ends of the battery or the temperature of the battery. The anomaly detection unit 13 is configured to detect whether the anomaly occurs in the charging loop which can be achieved by determining whether the battery parameter received by the communication unit 15 is greater than a predetermined battery parameter threshold. The anomaly occurs in the charging loop in event that the battery parameter is greater than the predetermined battery parameter threshold.

In at least one embodiment, the battery parameter is the voltage at the two ends of the battery. The anomaly detection unit 13 is configured to determine whether the voltage at the two ends of the battery is greater than a threshold. The anomaly detection unit 13 determines that the voltage at the two ends of the battery is the over-voltage and that the anomaly occurs in the charging loop in event that the voltage at the two ends of the battery is greater than the threshold.

In at least one embodiment, the battery parameter is the current at the two ends of the battery. The anomaly detection unit 13 is configured to determine whether the current at the two ends of the battery is greater than a threshold. The anomaly detection unit 13 is configured to determine that the current at the two ends of the battery is the over-current and that the anomaly occurs in the charging loop in event that the current at the two ends of the battery is greater than the threshold.

In at least one embodiment, the battery parameter is the temperature of the battery. The anomaly detection unit 13 is configured to determine whether the temperature of the battery is greater than a threshold. The anomaly detection unit 13 is configured to determine that the temperature of the battery is the over-temperature and that the anomaly occurs in the charging loop in event that the temperature the battery is greater than the threshold.

The power adapter 10 according to embodiments of the present disclosure is described in detail above by combining with FIG. 1 and FIG. 2. A terminal according to embodiments of the present disclosure will be described in detail below by combining with FIG. 3 and FIG. 4.

Figure 3:
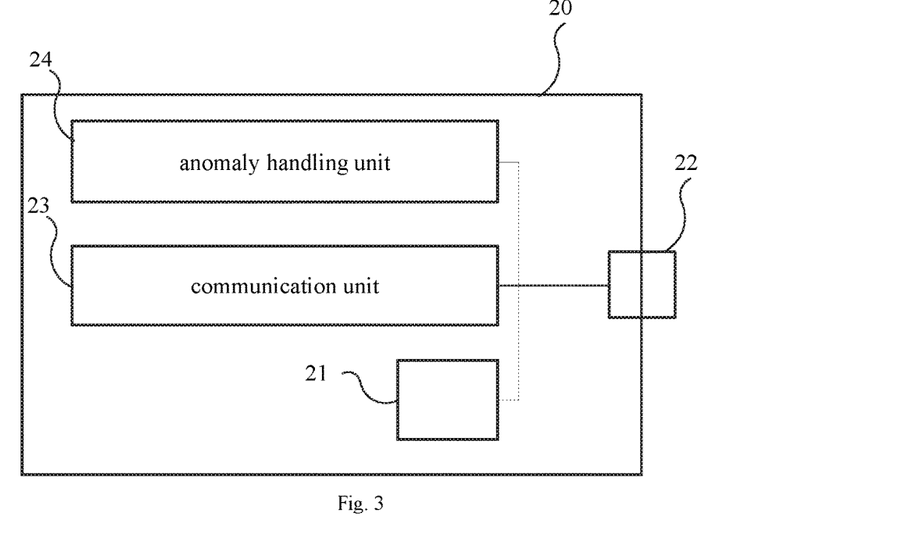
FIG. 3 is a schematic block diagram showing a terminal according to an embodiment of the present disclosure.

FIG. 3 is a schematic block diagram showing a terminal according to an embodiment of the present disclosure. The terminal 20 shown in FIG. 2 includes: a battery 21 and a charging interface 22. The terminal 20 is configured to form a charging loop with a power adapter through the charging interface 22, so as to charge the battery 21. The terminal 20 further includes a communication unit 23 and an anomaly handling unit 24. The communication unit 23 is configured to receive charging protection indicative information from the power adapter in event that an anomaly occurs in the charging loop. The anomaly handling unit 24 is configured to control the charging loop to enter into the protection state according to an indication of the charging protection indicative information.

In at least one embodiment, the above anomaly handling unit 24 is configured to control the charging loop to enter into the protection state according to the indication of the charging protection indicative information which can be achieved by reducing an output current of the power adapter according to the indication of the charging protection indicative information, or reducing an output voltage of the power adapter according to the indication of the charging protection indicative information, or controlling the charging loop to be disconnected according to the indication of the charging protection indicative information.

In embodiments of the present disclosure, in event that the anomaly occurs in the charging loop between the power adapter and the terminal 20, the communication unit 23 of the terminal 20 receives the charging protection indicative information from the power adapter and controls the charging loop to enter into the protection state according to the indication of the charging protection indicative information.

Figure 4:
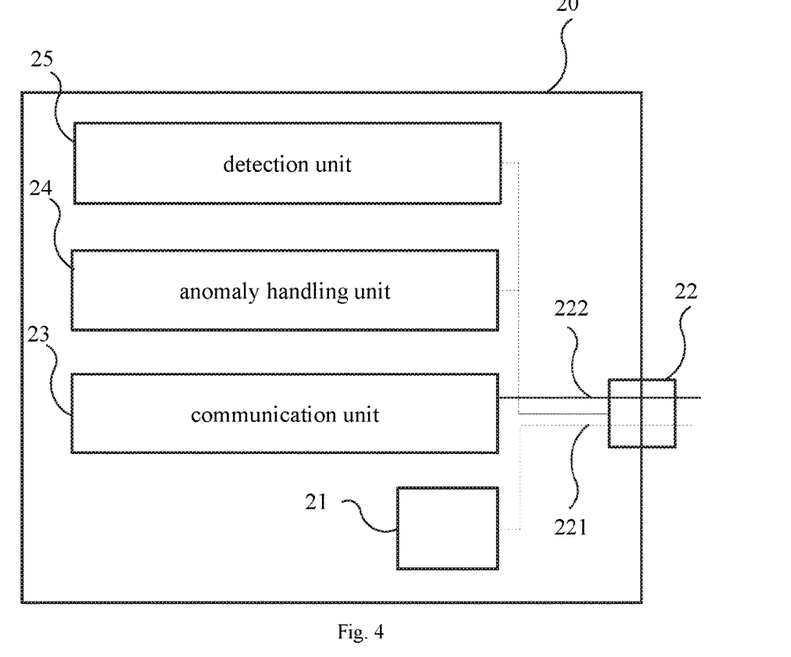
FIG. 4 is a schematic block diagram showing a terminal according to another embodiment of the present disclosure.

In at least one embodiment, as shown in FIG. 4, the charging interface 22 can include a power wire 221 and a data wire 222. The terminal 20 is configured to form the charging loop with the power adapter through the charging interface 22 so as to charge the battery which can be achieved by forming the charging loop with the power adapter through the power wire 221 in the charging interface 22 so as to charge the battery. The communication unit 23 is configured to receive the charging protection indicative information from the power adapter which can be achieved by receiving the charging protection indicative information from the power adapter through the date wire 222 in the charging interface 22.

In at least one embodiment, the charging interface 22 can be a USB (Universal Serial Bus) interface or a micro USB interface. The power wire in the USB interface can include a +5V power wire and a −5V power wire. The data wire in the USB interface can include a D+ wire and a D− wire.

In at least one embodiment, the anomaly in the charging loop includes at least one of the following anomalies that: an output voltage of the power adapter is an over-voltage, an output current of the power adapter is an over-current, a voltage at two ends of the battery 21 is an over-voltage, a current at two ends of the battery 21 is an over-current, and a temperature of the battery 21 is an over-temperature.

In at least one embodiment, as shown in FIG. 4, the terminal 20 further includes: a detection unit 25. The detection unit 25 is configured to detect a battery parameter of the battery 21. The battery parameter can include: the voltage at the two ends of the battery 21, the current at the two ends of the battery 21 or the temperature of the battery 21. The communication unit 23 is further configured to send information indicating the battery parameter to the power adapter.

Figure 5:
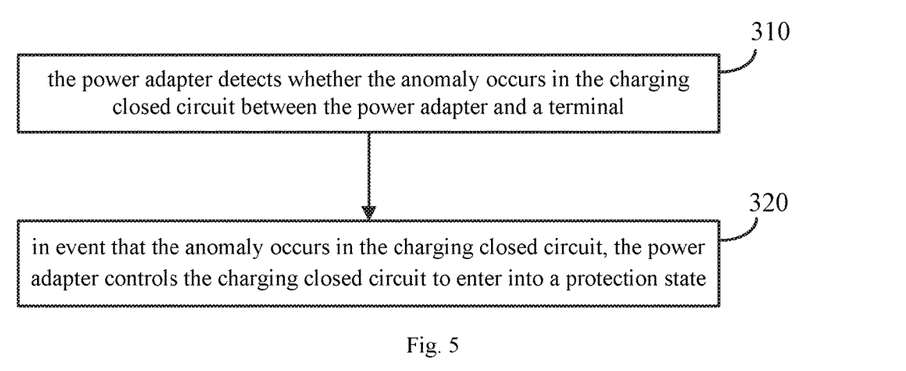
FIG. 5 is a schematic flow chart showing a method for handling an anomaly in a charging loop according to an embodiment of the present disclosure.

FIG. 5 is a schematic flow chart showing a method for handling an anomaly in a charging loop according to an embodiment of the present disclosure. The method shown in FIG. 5 is executed by the power adapter 10 shown in FIG. 1 or FIG. 2, which is not described herein to avoid needless duplication. The method in FIG. 5 includes the following blocks.

In block 310, the power adapter detects whether the anomaly occurs in the charging loop between the power adapter and a terminal.

In block 320, in event that the anomaly occurs in the charging loop, the power adapter controls the charging loop to enter into a protection state.

In embodiments of the present disclosure, the power adapter detects whether the anomaly occurs in the charging loop through the anomaly detection unit, and controls the charging loop to enter into the protection state through the anomaly handling unit in event that it is detected that the anomaly occurs in the charging loop.

In at least one embodiment, the method in FIG. 5 can further include: sending by the power adapter charging protection indicative information to the terminal, so as to indicate the terminal to control the charging loop to enter into the protection state.

In at least one embodiment, the power adapter is contacted with the terminal through a charging interface. The charging interface includes a power wire for charging and a data wire. Sending by the power adapter the charging protection indicative information to the terminal includes: sending by the power adapter the charging protection indicative information to the terminal through the data wire.

In at least one embodiment, controlling by the power adapter the charging loop to enter into the protection state includes: reducing by the power adapter an output voltage of the power adapter; reducing by the power adapter an output current of the power adapter; or disconnecting by the power adapter the charging loop.

In at least one embodiment, the anomaly in the charging loop includes at least one of the following anomalies that: the output voltage of the power adapter is an over-voltage, the output current of the power adapter is an over-current, a voltage at two ends of a battery is an over-voltage, a current at two ends of the battery is an over-current, and a temperature of the battery is an over-temperature.

In at least one embodiment, detecting by the power adapter whether the anomaly occurs in the charging loop between the power adapter and the terminal includes: detecting by the power adapter a value of the output voltage of the power adapter; determining by the power adapter that the value of the output voltage is the over-voltage and that the anomaly occurs in the charging loop in event that the value of the output voltage is greater than a voltage threshold.

In at least one embodiment, the method in FIG. 5 can further include: sending by the power adapter first indicative information to the terminal in event that the value of the output voltage of the power adapter is less than the voltage threshold. The first indicative information includes the value of the output voltage of the power adapter and is configured to indicate the terminal to re-determine based on a voltage threshold set at the terminal side whether the output voltage of the power adapter is the over-voltage.

In at least one embodiment, detecting by the power adapter whether the anomaly occurs in the charging loop between the power adapter and the terminal includes: detecting by the power adapter a value of the output current of the power adapter; determining by the power adapter that the output current is the over-current and that the anomaly occurs in the charging loop, if the value of the output current is greater than a current threshold.

In at least one embodiment, the method in FIG. 5 can further include: sending by the power adapter second indicative information to the terminal in event that the value of the output current of the power adapter is less than the current threshold. The second indicative information includes the value of the output current of the power adapter and is configured to indicate the terminal to re-determine based on a current threshold set at the terminal side whether the output current of the power adapter is the over-current.

In at least one embodiment, the method in FIG. 5 can further include: receiving a battery parameter detected by the terminal. The battery parameter is configured to indicate the voltage at the two ends of the battery, the current at the two ends of the battery or the temperature of the battery. Controlling by the power adapter the charging loop to enter into the protection state includes: determining by the power adapter whether the battery parameter is greater than a predetermined battery parameter threshold; determining by the power adapter that the anomaly occurs in the charging loop in event that the battery parameter is greater than the predetermined battery parameter threshold.

Figure 6:
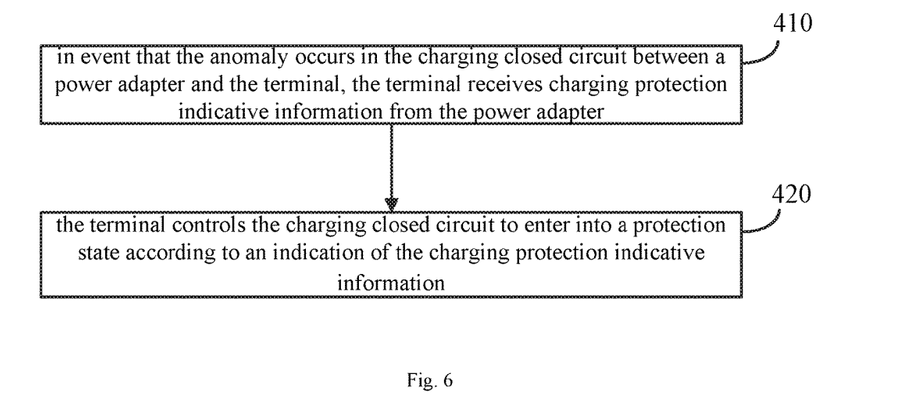
FIG. 6 is a schematic flow chart showing a method for handling an anomaly in a charging loop according to an embodiment of the present disclosure.

FIG. 6 is a schematic flow chart showing a method for handling an anomaly in a charging loop according to an embodiment of the present disclosure. The method shown in FIG. 6 is executed by the terminal shown in FIG. 3 or FIG. 4, which is not described herein to avoid needless duplication.

In block 410, in event that the anomaly occurs in the charging loop between a power adapter and the terminal, the terminal receives charging protection indicative information from the power adapter.

In block 420, the terminal controls the charging loop to enter into a protection state according to an indication of the charging protection indicative information.

In embodiments of the present disclosure, in event that the anomaly occurs in the charging loop between the power adapter and the terminal, the terminal receives the charging protection indicative information from the power adapter and controls the charging loop to enter into the protection state, such that the safety during the charging is improved.

In at least one embodiment, the power adapter is contacted with the terminal through a charging interface. The charging interface includes a power wire for charging and a data wire. Receiving by the terminal the charging protection indicative information from the power adapter includes: receiving by the terminal the charging protection indicative information from the power adapter through the data wire in the charging interface.

In at least one embodiment, the anomaly in the charging loop includes at least one of the following anomalies that: an output voltage of the power adapter is an over-voltage, an output current of the power adapter is an over-current, a voltage at two ends of a battery is an over-voltage, a current at the two ends of the battery is an over-current, and a temperature of the battery is an over-temperature.

In at least one embodiment, the method in FIG. 6 can further include: determining by the terminal a battery parameter of the battery. The battery parameter includes the voltage at the two ends of the battery, the current at the two ends of the battery or the temperature of the battery. The method in FIG. 6 can further include: sending by the terminal information indicating the battery parameter to the power adapter.

Those skilled in the art can be aware that, in combination with the examples described in the embodiments disclosed in this specification, units and algorithm blocks can be implemented by electronic hardware, or a combination of computer software and electronic hardware. Whether the functions are executed by hardware or software depends on particular applications and design constraint conditions of the technical solutions. Those skilled in the art can use different methods to implement the described functions for each particular application, but it should not be considered that the implementation goes beyond the scope of the present disclosure.

It would be appreciated by those skilled in the art that, for the purpose of simplification convenience of description, concerning the specific working process of the above system, device and unit as described above, reference is made to the method embodiments of the present disclosure, which will not be elaborated herein.

In several embodiments provided in the application, it should be understood that the disclosed system, device and method can be realized by other manners. For example, the above-described embodiments are only exemplary; for example, the division of said unit is only a logic function division; there can be additional dividing manners during the actual implementation. For example, multiple units or components can be combined or integrated into another system, or some features can be ignored, or not implemented. Another point, the displayed or discussed mutual coupling or direct coupling or communication connection can be indirect coupling or communication connection of devices or units via some interfaces, in electronic, mechanical, or other forms.

Said unit described as a separation part can be or can not be separated physically; the part displayed as a unit can be or can not be a physical unit, namely it can be located in one place, or can be distributed to multiple network units. Part or all of the units can be selected according to actual needs to achieve the purpose of the embodiment.

In addition, all functional units in the embodiments of the disclosure can be integrated in one processing unit, or each unit exists individually in physical form, or two or more units are integrated in one unit.

If said function is realized in the form of software function unit and sold or used as an independent product, it can be stored in a computer readable storage medium. With such an understanding, the technical solution of the disclosure substantially or its portion that contributes to the prior art or a portion of the technical solution can embody in the form of a computer software product which is stored in a memory media, including a plurality of instructions such that a computer (can be a personal computer, a server, or a network device, etc.) executes all or some blocks of the methods described in each of all the embodiments. And the previously mentioned memory media include such media capable of storing program codes as USB flash disk, portable hard drive, read-only memory (ROM), random access memory (RAM), floppy disk or compact disk.

The above descriptions are only specific embodiments of the disclosure, but not intended to limit the protection scope of the disclosure. The variation or replacement easily thought of by those of skill in the art within the technical scope disclosed by the disclosure, shall fall within the protection scope of the disclosure. Therefore, the protection scope of the disclosure shall be determined with reference to the protection scope of the claims.

What is claimed is:

1. A power adapter, comprising a power conversion unit and a charging interface, the power conversion unit being configured to form a charging loop with a terminal via the charging interface so as to charge a battery of the terminal, and wherein, the power adapter further comprises an anomaly detection unit and an anomaly handling unit;
   the anomaly detection unit is configured to detect whether an anomaly occurs in the charging loop, and the anomaly handling unit is configured to control the charging loop to enter into a protection state if the anomaly occurs in the charging loop, wherein
   the anomaly detection unit is configured to: detect a value of the output voltage of the power adapter; compare the value of the output voltage of the power adapter with a first voltage threshold; and determine that the output voltage of the power adapter is an over-voltage and that the anomaly occurs in the charging loop, if the value of the output voltage is greater than the first voltage threshold;
   and/or, the anomaly detection unit is configured to: detect a value of the output current of the power adapter; compare the value of the output current of the power adapter with a first current threshold; and determine that the output current of the power adapter is an over-current and that the anomaly occurs in the charging loop, if the value of the output current is greater than the first current threshold.

2. The power adapter according to claim 1, further comprising:
   a communication unit, configured to send charging protection indicative information to the terminal if the anomaly occurs in the charging loop, so as to indicate the terminal to control the charging loop to enter into the protection state.

3. The power adapter according to claim 2, wherein, the charging interface comprises a power wire and a data wire;
   the power conversion unit is configured to form the charging loop with the terminal via the power wire in the charging interface so as to charge the battery of the terminal; and
   the communication unit is configured to send the charging protection indicative information to the terminal via the data wire in the charging interface.

4. The power adapter according to claim 1, wherein, the anomaly handling unit is configured to control the charging loop to enter into the protection state by acts of:
   reducing an output voltage of the power adapter;
   reducing an output current of the power adapter; or
   disconnecting the charging loop.

5. The power adapter according to claim 1, wherein, the anomaly occurring in the charging loop comprises at least one of following anomalies that:
   an output voltage of the power adapter is an over-voltage;
   an output current of the power adapter is an over-current;
   a voltage at two ends of the battery is an over-voltage;
   a current at the two ends of the battery is an over-current; and
   a temperature of the battery is an over-temperature.

6. The power adapter according to claim 1, further comprising:
   a communication unit, configured to send first indicative information to the terminal if the value of the output voltage of the power adapter is less than the first voltage threshold, wherein the first indicative information comprises the value of the output voltage of the power adapter and is configured to indicate the terminal to re-determine based on a second voltage threshold set at the terminal side whether the output voltage of the power adapter is the over-voltage.

7. The power adapter according to claim 1, wherein, the anomaly handling unit comprises a first over-voltage protection unit and a second over-voltage protection unit; and
   the anomaly handling unit is configured to:
   control the charging loop to enter into the protection state through the first over-voltage protection unit; and
   control the charging loop to enter into the protection state through the second over-voltage protection unit, if the first over-voltage protection unit loses efficacy.

8. The power adapter according to claim 1, further comprising:
   a communication unit, configured to send second indicative information to the terminal if the value of the output current of the power adapter is less than the first current threshold, wherein the second indicative information comprises the value of the output current of the power adapter and is configured to indicate the terminal to re-determine based on a second current threshold set at the terminal side whether the output current of the power adapter is the over-current.

9. The power adapter according to claim 5, further comprising a communication unit; wherein
   the communication unit is configured to receive a battery parameter detected by the terminal, wherein the battery parameter is configured to indicate the voltage at the two ends of the battery, the current at the two ends of the battery or the temperature of the battery;

the anomaly detection unit is configured to:
determine whether the battery parameter received by the communication unit is greater than a predetermined battery parameter threshold; and
determine that the anomaly occurs in the charging loop, if the battery parameter is greater than the predetermined battery parameter threshold.

10. A method for handling an anomaly in a charging loop, comprising:
detecting, by a power adapter, whether the anomaly occurs in the charging loop between the power adapter and a terminal; and
controlling, by the power adapter, the charging loop to enter into a protection state if the anomaly occurs in the charging loop, wherein
detecting, by the power adapter, whether the anomaly occurs in the charging loop between the power adapter and the terminal comprises:
detecting, by the power adapter, a value of the output voltage of the power adapter, and determining, by the power adapter, that the output voltage is an over-voltage and that the anomaly occurs in the charging loop, if the value of the output voltage is greater than a first voltage threshold; and/or
detecting, by the power adapter, a value of the output current of the power adapter, and determining, by the power adapter, that the output current is an over-current and that the anomaly occurs in the charging loop, if the value of the output current is greater than a first current threshold.

11. The method according to claim 10, further comprising:
sending, by the power adapter, charging protection indicative information to the terminal, so as to indicate the terminal to control the charging loop to enter into the protection state.

12. The method according to claim 11, wherein,
the power adapter is contacted with the terminal through a charging interface, and the charging interface comprises: a power wire for charging, and a data wire; and
sending, by the power adapter, the charging protection indicative information to the terminal comprises:
sending, by the power adapter, the charging protection indicative information to the terminal through the data wire.

13. The method according to claim 10, wherein, controlling, by the power adapter, the charging loop to enter into protection state comprises:
reducing, by the power adapter, an output voltage of the power adapter;
reducing, by the power adapter, an output current of the power adapter; or
disconnecting, by the power adapter, the charging loop.

14. The method according to claim 10, wherein the anomaly occurring in the charging loop comprises at least one of following anomalies that:
an output voltage of the power adapter is an over-voltage;
an output current of the power adapter is an over-current;
a voltage at two ends of a battery is an over-voltage;
a current at the two ends of the battery is an over-current; and
a temperature of the battery is an over-temperature.

15. The method according to claim 10, further comprising:
sending, by the power adapter, first indicative information to the terminal if the value of the output voltage of the power adapter is less than the first voltage threshold, wherein the first indicative information comprises the value of the output voltage of the power adapter and is configured to indicate the terminal to re-determine based on a second voltage threshold set at the terminal side whether the output voltage of the power adapter is the over-voltage.

16. The method according to claim 10, further comprising:
sending, by the power adapter, second indicative information to the terminal if the value of the output current of the power adapter is less than the first current threshold, wherein the second indicative information comprises the value of the output current of the power adapter and is configured to indicate the terminal to re-determine based on a second current threshold set at the terminal side whether the output current of the power adapter is the over-current.

17. The method according to claim 14, further comprising:
receiving a battery parameter detected by the terminal, wherein the battery parameter is used to indicate the voltage at the two ends of the battery, the current at the two ends of the battery or the temperature of the battery;
wherein controlling, by the power adapter, the charging loop to enter into the protection state comprises:
determining, by the power adapter, whether the battery parameter is greater than a predetermined battery parameter threshold; and
determining, by the power adapter, that the anomaly occurs in the charging loop, if the battery parameter is greater than the predetermined battery parameter threshold.

* * * * *